United States Patent
Wu et al.

(10) Patent No.: US 8,622,117 B2
(45) Date of Patent: Jan. 7, 2014

(54) HEAT PIPE INCLUDING A MAIN WICK STRUCTURE AND AT LEAST ONE AUXILIARY WICK STRUCTURE

(75) Inventors: Sheng-Lin Wu, Tu-Cheng (TW); Yu-Liang Lo, Tu-Cheng (TW); Wen-Hu Chen, ShenZhen (CN); Yue Liu, ShenZhen (CN); Nien-Tien Cheng, Taipei Hsien (TW)

(73) Assignees: Furui Precise Component (Kunshan) Co., Ltd., Kunshan (CN); Foxconn Technology Co., Ltd., New Taipei (TW)

( * ) Notice: Subject to any disclaimer, the term of this patent is extended or adjusted under 35 U.S.C. 154(b) by 1229 days.

(21) Appl. No.: 12/491,246

(22) Filed: Jun. 25, 2009

(65) Prior Publication Data
US 2010/0155032 A1    Jun. 24, 2010

(51) Int. Cl.
F28D 15/00    (2006.01)

(52) U.S. Cl.
USPC .................................. 165/104.26; 29/890.032

(58) Field of Classification Search
USPC .................................. 165/104.26; 29/890.032
See application file for complete search history.

(56) References Cited

U.S. PATENT DOCUMENTS

| | | | | |
|---|---|---|---|---|
| 3,620,298 A | * | 11/1971 | Somerville et al. | 165/104.26 |
| 3,677,329 A | * | 7/1972 | Kirkpatrick | 165/104.26 |
| 3,681,843 A | * | 8/1972 | Arcella et al. | 29/890.032 |
| 3,834,457 A | * | 9/1974 | Madsen | 165/104.26 |
| 3,857,441 A | * | 12/1974 | Arcella | 165/104.26 |
| 3,948,316 A | * | 4/1976 | Souriau | 165/104.26 |
| 4,003,427 A | * | 1/1977 | Leinoff et al. | 165/104.26 |
| 4,108,239 A | * | 8/1978 | Fries | 165/104.26 |
| 4,196,504 A | * | 4/1980 | Eastman | 29/890.032 |
| 4,463,798 A | * | 8/1984 | Pogson et al. | 165/104.23 |
| 4,515,207 A | * | 5/1985 | Alario et al. | 165/104.26 |
| 4,890,668 A | * | 1/1990 | Cima | 165/104.25 |
| 5,720,339 A | * | 2/1998 | Glass et al. | 165/104.26 |
| 6,460,612 B1 | * | 10/2002 | Sehmbey et al. | 165/104.26 |
| 6,725,910 B2 | * | 4/2004 | Ishida et al. | 165/104.26 |
| 7,229,104 B2 | * | 6/2007 | Hsu | 165/104.26 |
| 7,430,804 B2 | | 10/2008 | Hou et al. | |
| 7,694,726 B2 | * | 4/2010 | Chen | 165/104.26 |
| 7,802,362 B2 | | 9/2010 | Hou et al. | |
| 2006/0207749 A1 | * | 9/2006 | Hsu | 165/104.26 |
| 2007/0089864 A1 | | 4/2007 | Chang et al. | |

FOREIGN PATENT DOCUMENTS

| | | |
|---|---|---|
| CN | 1936479 | 3/2007 |
| CN | 1955628 | 5/2007 |
| CN | 101074853 | 11/2007 |

* cited by examiner

*Primary Examiner* — Ljiljana Ciric
(74) *Attorney, Agent, or Firm* — Wei Te Chung; Ming Chieh Chang

(57) ABSTRACT

A heat pipe includes a casing, a main wick structure received in the casing, an auxiliary wick structure received in the main wick structure, and a working fluid contained in the casing. The main wick structure is attached to an inner surface of the casing. An inner peripheral surface of the main wick structure and an outer peripheral surface of the auxiliary wick structure cooperatively define a vapor channel. The auxiliary wick structure is hollow, and extends along a longitudinal direction of the casing. A liquid channel is defined in the auxiliary wick structure. Two ends of the auxiliary wick structure are both fixed on the two ends of the casing. The working fluid is saturated in the main wick structure and the auxiliary wick structure.

1 Claim, 9 Drawing Sheets

HEAT PIPE INCLUDING A MAIN WICK STRUCTURE AND AT LEAST ONE AUXILIARY WICK STRUCTURE

BACKGROUND

1. Technical Field

The present invention relates generally to an apparatus for transfer or dissipation of heat from heat-generating components, and more particularly to a heat pipe applicable in electronic products such as personal computers for removing heat from electronic components installed therein and a method for manufacturing the same.

2. Description of Related Art

Heat pipes have excellent heat transfer performance due to their low thermal resistance, and are therefore an effective means for transfer or dissipation of heat from heat sources. Currently, heat pipes are widely used for removing heat from heat-generating components such as central processing units (CPUs) of computers. A heat pipe is usually a vacuum casing containing therein a working medium, which is employed to carry, under phase transitions between liquid state and vapor state, thermal energy from one section of the heat pipe (typically referring to as the "evaporator section") to another section thereof (typically referring to as the "condenser section"). Preferably, a wick structure is provided inside the heat pipe, lining an inner wall of the casing, for drawing the working medium back to the evaporator section after it is condensed at the condenser section. The wick structure currently available for the heat pipe includes fine grooves integrally formed at the inner wall of the casing, screen mesh or fiber inserted into the casing and held against the inner wall thereof, or sintered powders combined to the inner wall of the casing by sintering process.

In operation, the evaporator section of the heat pipe is maintained in thermal contact with a heat-generating component. The working medium contained at the evaporator section absorbs heat generated by the heat-generating component and then turns into vapor. Due to the difference of vapor pressure between the two sections of the heat pipe, the generated vapor moves and thus carries the heat towards the condenser section where the vapor is condensed into condensate after releasing the heat into ambient environment by, for example, fins thermally contacting the condenser section. Due to the difference in capillary pressure which develops in the wick structure between the two sections, the condensate is then brought back by the wick structure to the evaporator section where it is again available for evaporation.

In order to draw the condensate back timely, the wick structure provided in the heat pipe is expected to provide a high capillary force and meanwhile generate a low flow resistance for the condensate. In ordinary use, the heat pipe needs to be flattened to enable the miniaturization of electronic products, which results in the wick structure of the heat pipe being damaged. Therefore, the flow resistance of the wick structure is increased and the capillary force provided by the wick structure is decreased, which reduces the heat transfer capability of the heat pipe. If the condensate is not quickly brought back from the condenser section, the heat pipe will suffer a dry-out problem at the evaporator section.

Therefore, it is desirable to provide a heat pipe with improved heat transfer capability, whose wick structure will not be damaged when the heat pipe is flattened.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Figure 1:
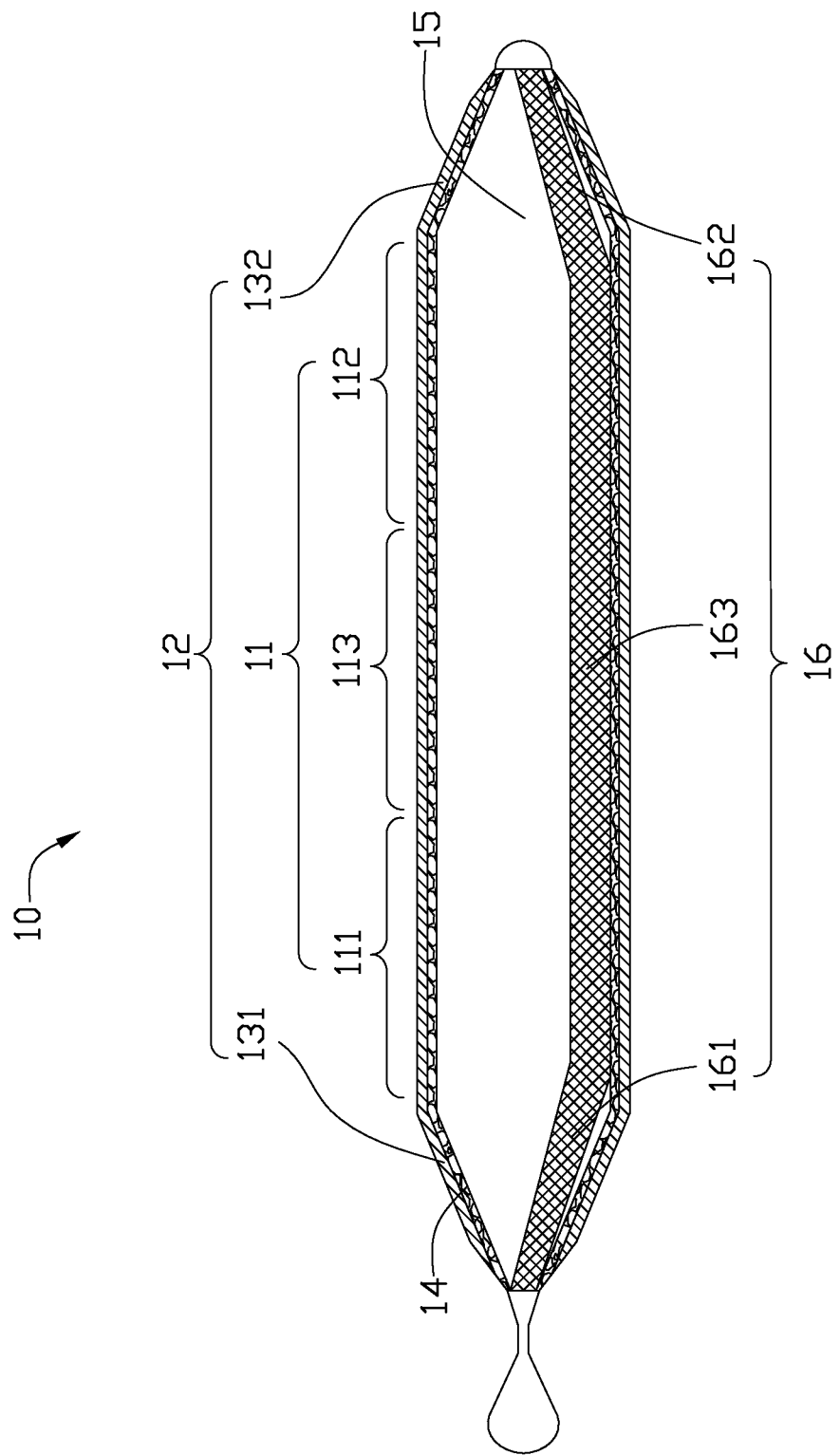
FIG. 1 is a longitudinal cross-sectional view of a heat pipe in accordance with a first embodiment of the present invention.
Figure 2:
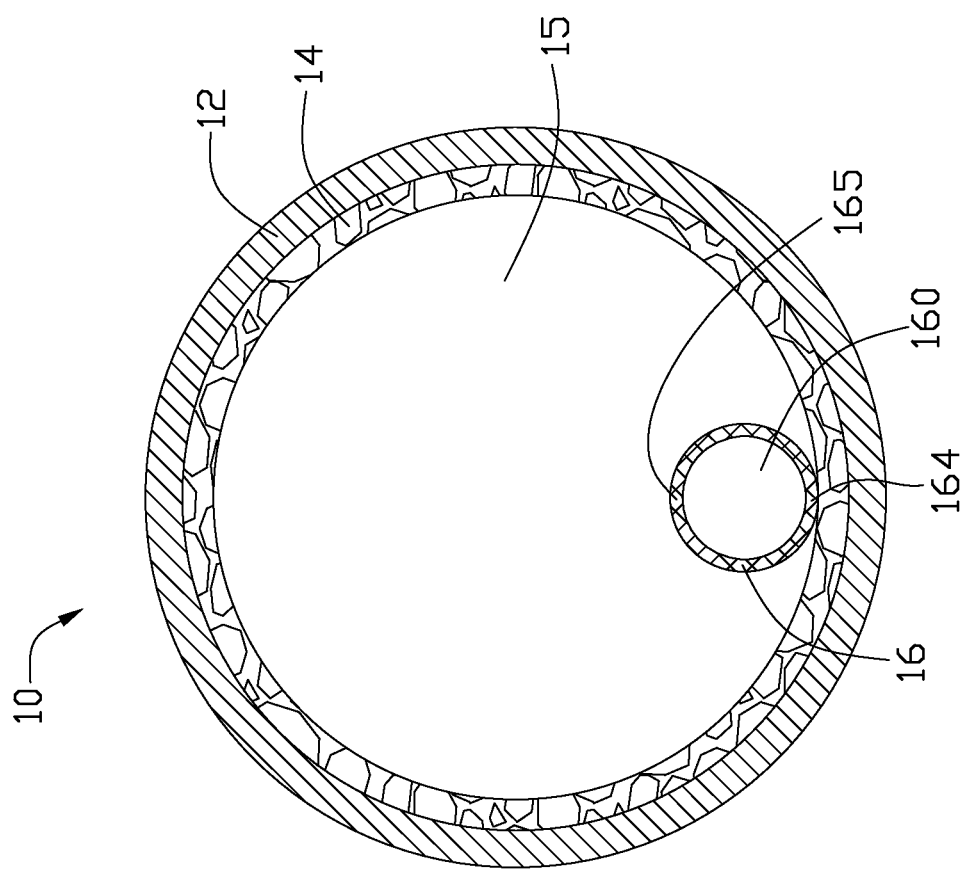
FIG. 2 is a transverse cross-sectional view of the heat pipe of FIG. 1.

Referring to FIGS. 1 and 2, a heat pipe 10 includes a longitudinal casing 12 having a circular cross-section and containing a working fluid (not shown) therein, a main wick structure 14 and an auxiliary wick structure 16.

The casing 12 is made of high thermally conductive material such as copper or aluminum. The casing 12 includes a main body 11, a first shrinkage end 131 and a second shrinkage end 132. The first and the second shrinkage ends 131, 132 are located at two longitudinal ends of the casing 12, respectively. The main body 11 has an evaporator section 111, an opposing condenser section 112, and an adiabatic section 113 disposed between the evaporator section 111 and the condenser section 112. The evaporator section 111 and the condenser section 112 connect with the first and the second shrinkage ends 131, 132 of the casing 12, respectively. The first and the second shrinkage ends 131, 132 of the casing 12 are longitudinally tapered from the evaporator section 111 and the condenser section 112 and sealed, respectively.

The main wick structure 14 is tube-shaped in profile, which is evenly distributed around and attached to an inner surface of the casing 12. The main wick structure 14 defines a receiving space therein. The main wick structure 14 extends along a longitudinal direction of the casing 12. The main wick structure 14 is usually selected from a porous structure such as grooves, sintered powder, screen mesh, or bundles of fiber, and provides a capillary force to drive condensed working fluid at the condenser section 112 to flow towards the evaporator section 111 of the heat pipe 10.

The auxiliary wick structure 16 is a longitudinal, hollow tube, which is received in the receiving space of the main wick structure 14 and extends along the longitudinal direction of the casing 12. An inner peripheral surface of the main wick structure 14 and an outer peripheral surface of the auxiliary wick structure 16 cooperatively define a vapor channel 15 in the casing 12. The auxiliary wick structure 16 includes a main portion 163 corresponding to the main body 11 of the casing 12, a first end 161 corresponding to the first shrinkage end 131 of the casing 12, and a second end 162 corresponding to the second shrinkage end 132 of the casing 12. The first and the second ends 161, 162 of the auxiliary wick structure 16 are fixed on the first and the second shrinkage ends 131, 132 of the casing 12, respectively. In other embodiments, the first end 161 of the auxiliary wick structure 16 is fixed on the first shrinkage end 131 of the casing 12, and the second end 162 of the auxiliary wick structure 16 is freely disposed on the main wick structure 14 and is not fixed on the second shrinkage end 132 of the casing 12.

The auxiliary wick structure 16 has a ring-like transverse cross section. The auxiliary wick structure 16 longitudinally defines a liquid channel 160 therein, which extends from the first end 161 toward the second end 162 of the auxiliary wick structure 16. An outer diameter of the auxiliary wick structure 16 is smaller than a bore diameter of the main wick structure 14. The outer peripheral surface of the main portion 163 of the auxiliary wick structure 16 has a bottom side 164 contacting with the inner peripheral surface of the main wick structure 14, and a top side 165 spaced from the inner peripheral surface of the main wick structure 14.

The auxiliary wick structure 16 is a single-layered structure, which is formed by weaving a plurality of metal wires, such as copper, or stainless steel wires. A plurality of pores (not shown) are formed in the outer peripheral surface of the auxiliary wick structure 16, which provides a capillary action to the working fluid. In other embodiments, the auxiliary wick structure 16 is a multi-layered structure.

The working fluid is saturated in the main and the auxiliary wick structures 14, 16 and is usually selected from a liquid such as water, methanol, or alcohol, which has a low boiling point and is compatible with the main and the auxiliary wick structures 14, 16. Thus, the working fluid can easily evaporate to vapor when it receives heat at the evaporator section 111 of the heat pipe 10.

In operation, the evaporator section 111 of the heat pipe 10 is placed in thermal contact with a heat source (not shown), for example, a central processing unit (CPU) of a computer, which needs to be cooled. The working fluid contained in the evaporator section 111 of the heat pipe 10 is vaporized into vapor upon receiving the heat generated by the heat source. Then, the generated vapor moves via the vapor channel 15 towards the condenser section 112 of the heat pipe 10. After the vapor releases the heat carried thereby and is condensed into the liquid in the condenser section 112, the liquid is brought back by the main wick structure 14 to the evaporator section 111 of the heat pipe 10 for being available again for evaporation.

Meanwhile, the liquid resulting from the vapor in the condenser section 112 is capable of entering into the liquid channel 160 of the auxiliary wick structure 16 and brought back to the evaporator section 111 of the heat pipe 10 easily due to the capillary action of the auxiliary wick structure 16. As a result, the liquid is drawn back to the evaporator section 111 rapidly and timely, thus preventing a potential dry-out problem occurring at the evaporator section 111.

In addition, due to the presence of the auxiliary wick structure 16, the working fluid is prevented from being accumulated in a bottom portion of the main wick structure 14 of the heat pipe 10 under an action of gravity. This prevents the increase of the flow resistance of the heat pipe 10, which is caused by the accumulation of the working fluid at the bottom portion of the main wick structure 14. The heat transfer capability of the heat pipe 10 is thus increased.

Moreover, the first and the second ends 161, 162 of the auxiliary wick structure 16 are respectively fixed on the first and the second shrinkage ends 131, 132 of the casing 12, which prevents the auxiliary wick structure 16 from moving in the casing 12, to thereby increase the capillary action of the auxiliary wick structure 16 and decrease the heat resistance of the heat pipe 10.

Figure 3:
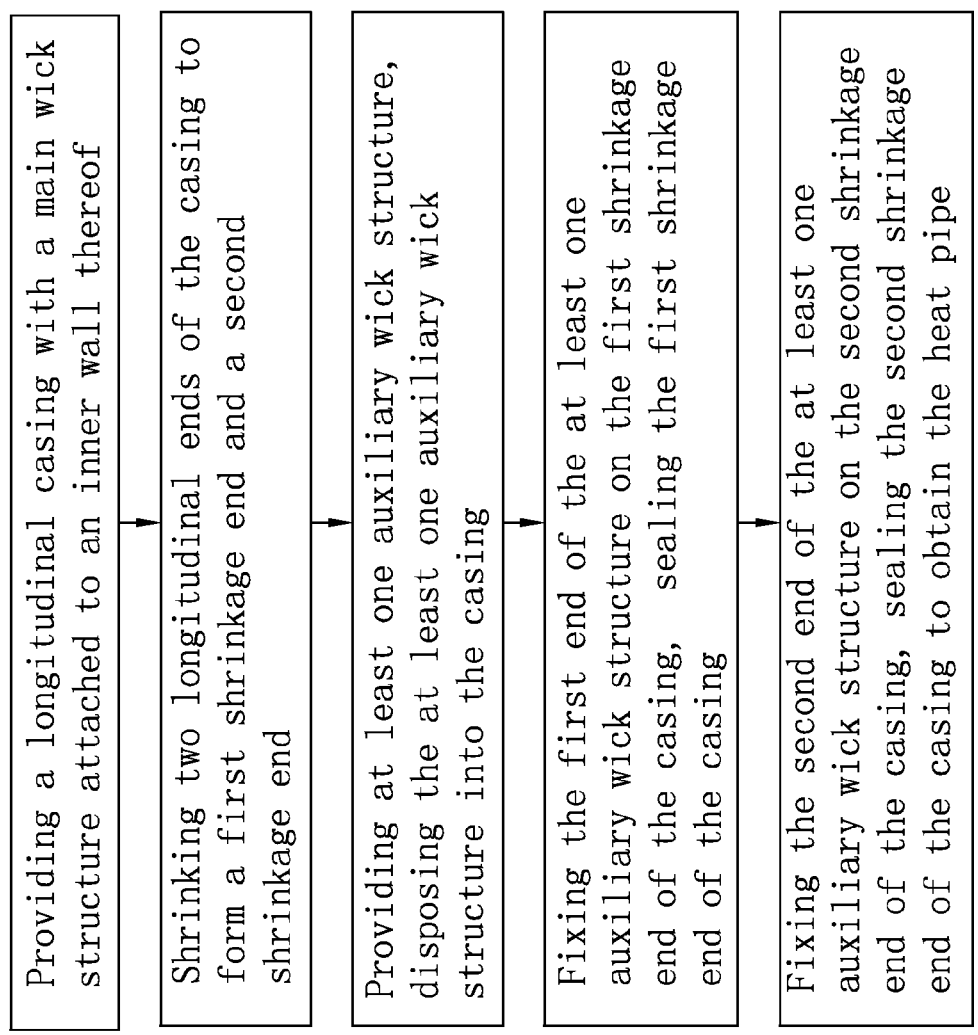
FIG. 3 is a flow chart showing a method for manufacturing the heat pipe of FIG. 1.
Figure 4:
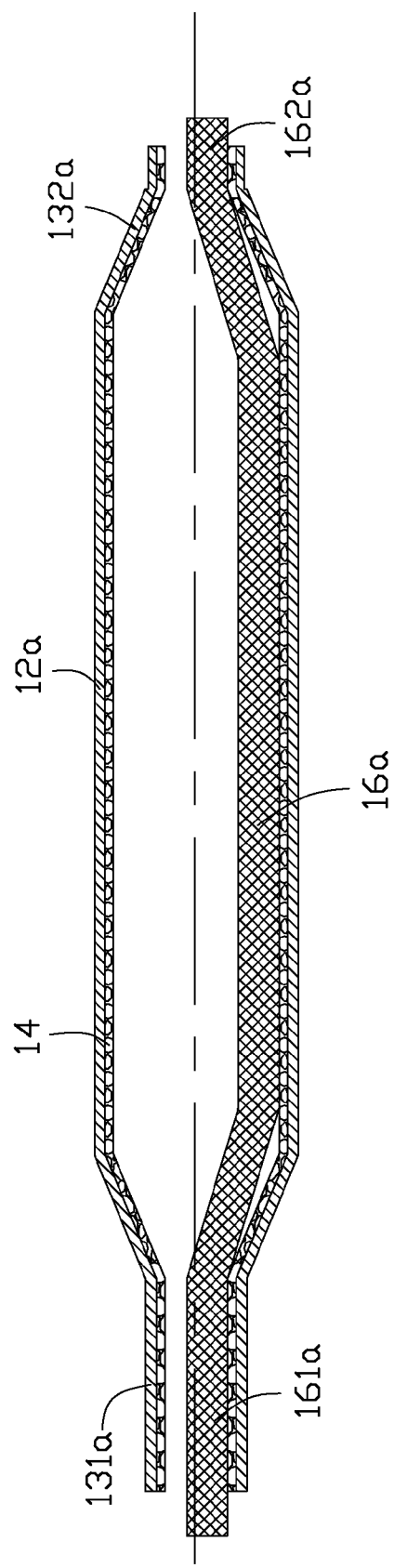
FIG. 4 shows an auxiliary wick structure disposed in a heat pipe after the heat pipe is shrunk according to the method of FIG. 3.

Referring to FIGS. 3 and 4, a method for manufacturing the heat pipe 10 includes the following steps: providing a longitudinal casing 12a with a main wick structure 14 attached to an inner surface thereof; shrinking two longitudinal ends of the casing 12a to form a first shrinkage end 131a and a second shrinkage end 132a, respectively; providing an auxiliary wick structure 16a having a length larger than that of the casing 12a, disposing the auxiliary wick structure 16a into the casing 12a, the auxiliary wick structure 16a extending from the first shrinkage end 131a of the casing 12a to the second shrinkage end 132a of the casing 12a; fixing the first end 161a of the auxiliary wick structure 16a on the first shrinkage end 131a of the casing 12a and sealing the first shrinkage end 131a of the casing 12a by welding; vacuuming an interior of the casing 12a and filling the working fluid into the casing 12a; and fixing the second end 162a of the auxiliary wick structure 16a on the second shrinkage end 132a of the casing 12a and sealing the second shrinkage end 132a of the casing 12a by welding. In other embodiments, the second shrinkage end 132a of the casing 12a is sealed and the second end 162a of the auxiliary wick structure 16a is not fixed on the second shrinkage end 132a of the casing 12a but is freely disposed in the casing 12a.

Figure 5:
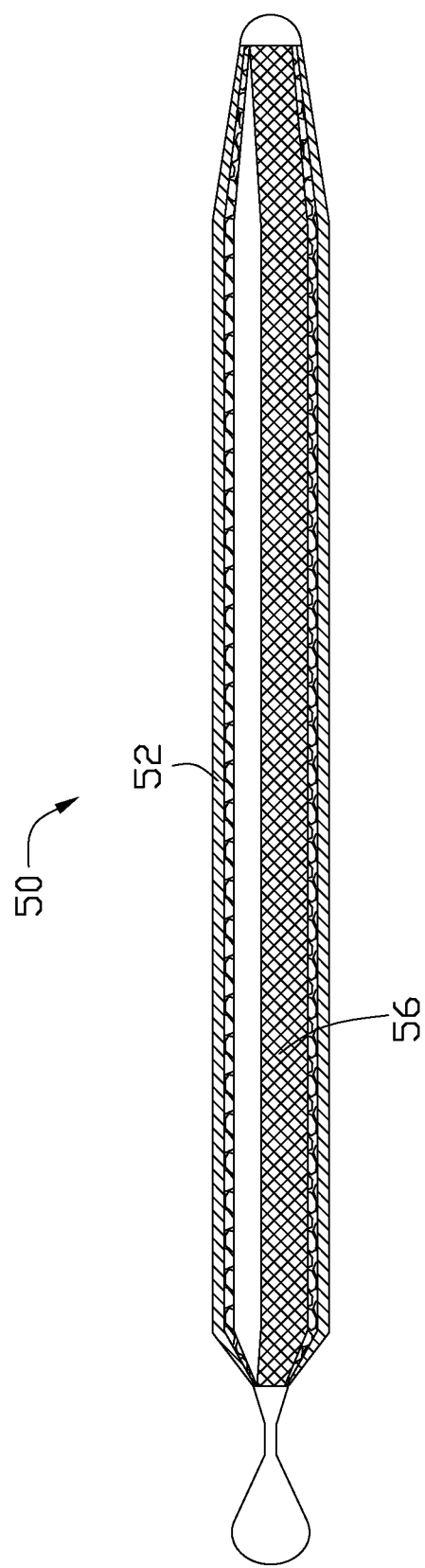
FIG. 5 is a longitudinal cross-sectional view of a heat pipe in accordance with a second embodiment of the present invention.
Figure 6:
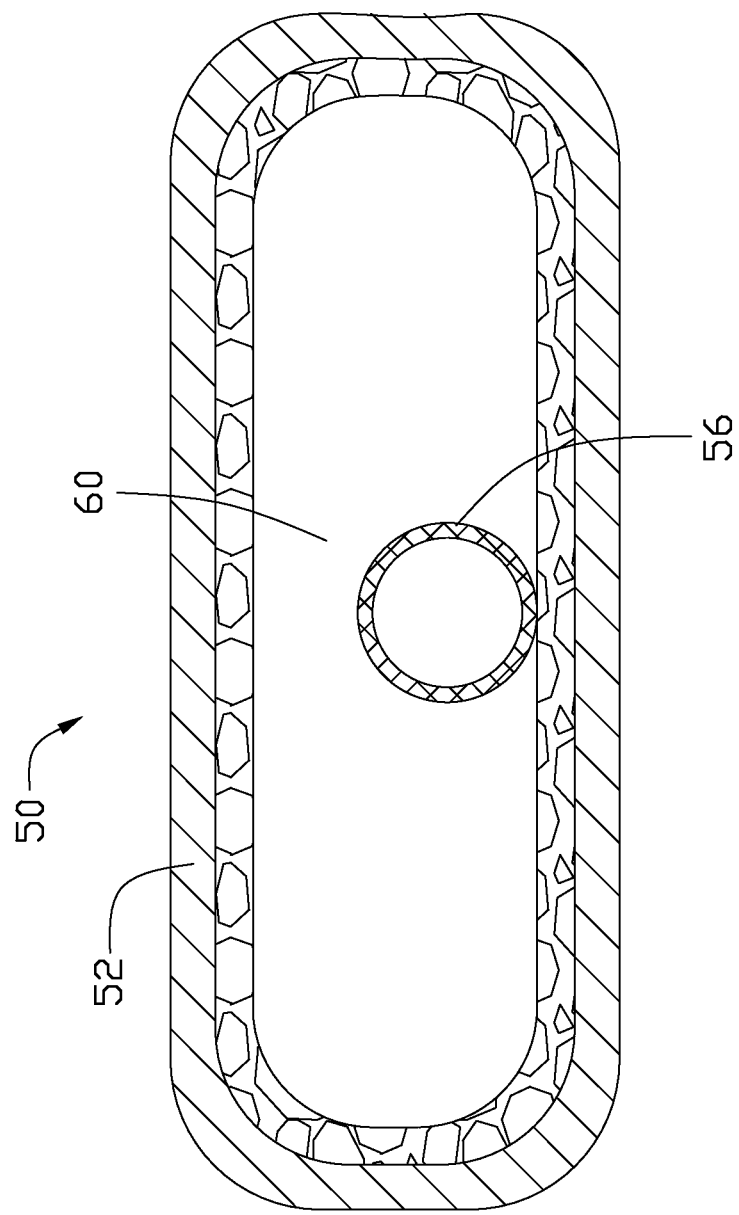
FIG. 6 is a transverse cross-sectional view of the heat pipe of FIG. 5.

As shown in FIGS. 5-6, a flat heat pipe 50 in accordance with a second embodiment of the present invention is obtained by flattening the heat pipe 10 of FIGS. 1 and 2. The heat pipe 50 has the same structure as the heat pipe 10 except that the heat pipe 50 is flat. After the flattening operation, the auxiliary wick structure 56 is kept intact, and the auxiliary wick structure 56 spaces a gap 60 from a top wall 52 of the heat pipe 50. The heat transfer capability of the flat heat pipe 50 is not decreased due to the flattening operation. The heat transfer capability of the flat heat pipe 50 is better than a conventional heat pipe whose wick structure is damaged in the flattening operation.

Figure 7:
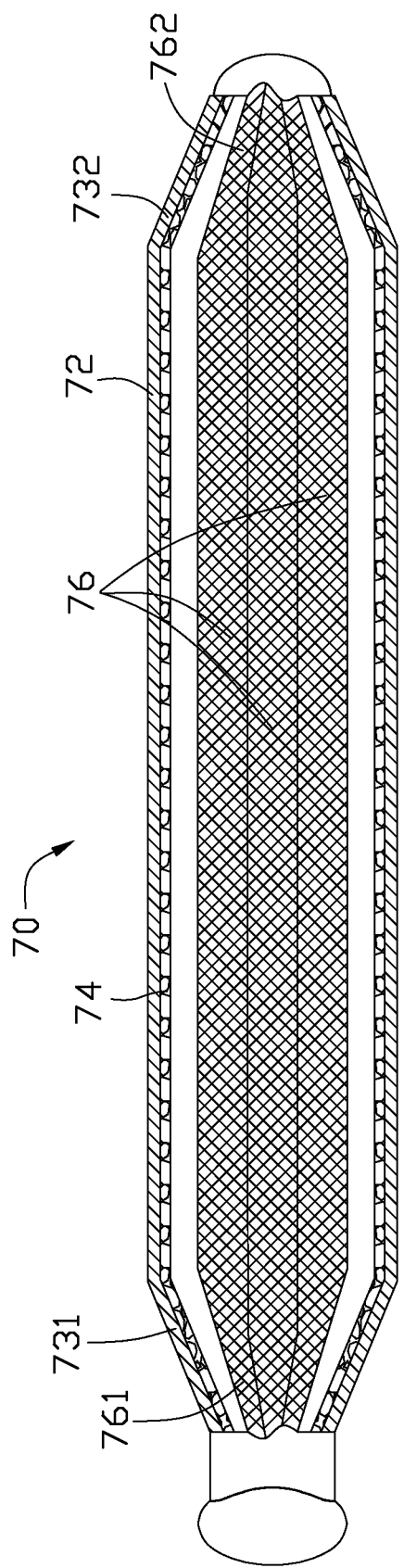
FIG. 7 is a longitudinal cross-sectional view of a heat pipe in accordance with a third embodiment of the present invention.
Figure 8:
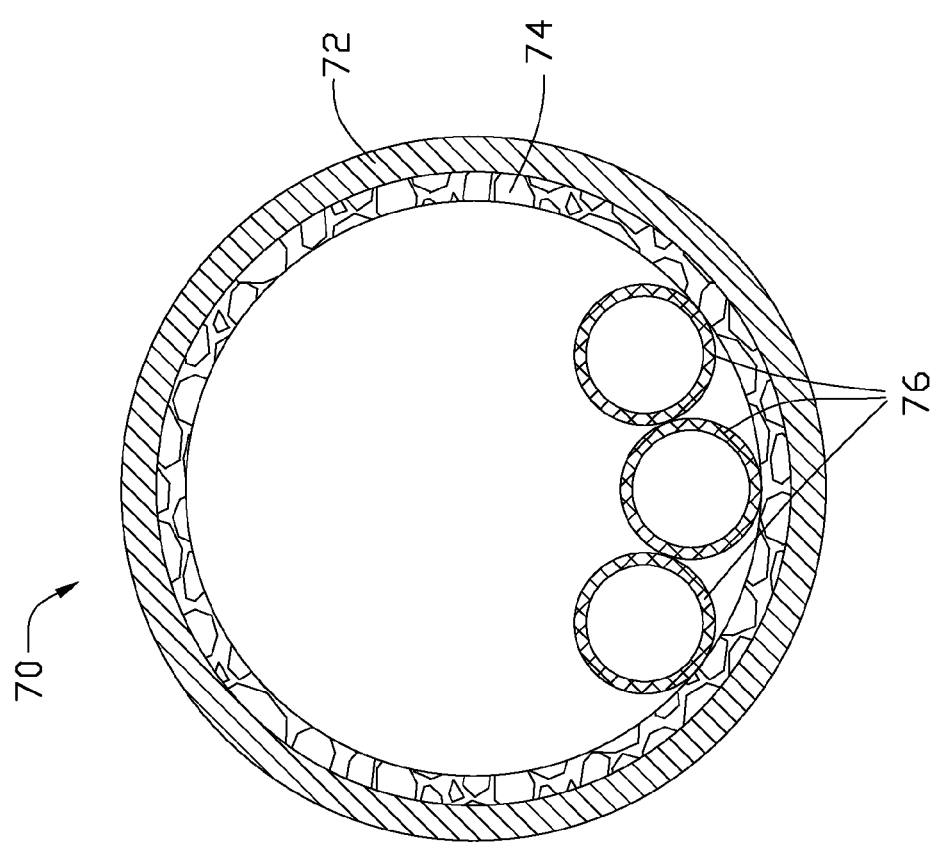
FIG. 8 is a transverse cross-sectional view of the heat pipe of FIG. 7.

FIGS. 7-8 show a heat pipe 70 having a circular cross-section according to a third embodiment of the present invention. The difference of this embodiment from the first embodiment is as follows. The heat pipe 70 includes three auxiliary wick structures 76 disposed in a receiving space of a main wick structure 74. Adjacent auxiliary wick structures 76 contact each other. Two longitudinal ends 761, 762 of each of the three auxiliary wick structures 76 are fixed on a first shrinkage end 731 and a second shrinkage end 732 of the casing 72, respectively.

Figure 9:
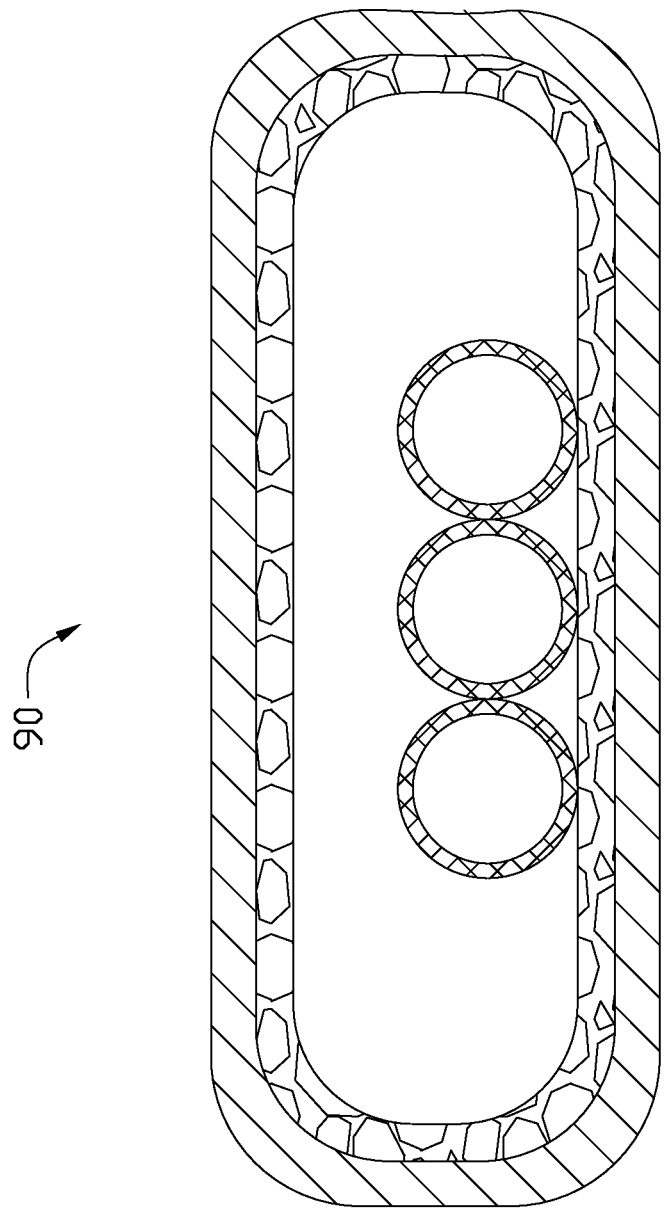
FIG. 9 is a transverse cross-sectional view of a heat pipe in accordance with a fourth embodiment of the present invention.

As shown in FIG. 9, a flat heat pipe 90 in accordance with a fourth embodiment of the present invention is obtained by flattening the heat pipe 70 of FIGS. 7 and 8. Similar to the flat heat pipe 50 of FIG. 6, the heat transfer capability of the flat heat pipe 90 is not decreased due to the flattening operation.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:
1. A heat pipe comprising:
    a casing having two opposite ends;
    a main wick structure received in the casing and attached to an inner surface of the casing;

at least one hollow auxiliary wick structure received in the main wick structure, an inner peripheral surface of the main wick structure and an outer peripheral surface of the at least one auxiliary wick structure cooperatively defining a vapor channel, the at least one auxiliary wick structure extending along a longitudinal direction of the casing, a liquid channel defined in the at least one auxiliary wick structure, at least one end of the at least one auxiliary wick structure being fixed on a respective one of the ends of the casing; and, a working fluid contained in the casing and saturating the main wick structure and the at least one auxiliary wick structure; wherein the at least one end of the at least one auxiliary wick structure includes two opposite ends of the at least one auxiliary wick structure, and the two ends of the at least one auxiliary wick structure are fixed on the two ends of the casing, respectively; and, wherein the two ends of the casing are a first shrinkage end and a second shrinkage end, and the two ends of the at least one auxiliary wick structure are fixed on the first shrinkage end and the second shrinkage end on of the casing, respectively.

\* \* \* \* \*